United States Patent
Villumsen et al.

(10) Patent No.: US 6,458,277 B1
(45) Date of Patent: Oct. 1, 2002

(54) METHOD AND APPARATUS FOR CLEANING PRODUCTS CONTAINING HEAVY METALS

(75) Inventors: Arne Villumsen, Vipstjertevej 4, DK-3400 Hillerod (DK); Joergen Birger Jensen, Deceased, Lyngby (DK), by Irgrid Groenlund Jensen, legal representative

(73) Assignee: Arne Villumsen, Hillerod (DK)

( * ) Notice: Subject to any disclaimer, the term of this patent is extended or adjusted under 35 U.S.C. 154(b) by 0 days.

(21) Appl. No.: 09/493,704

(22) Filed: Jan. 28, 2000

Related U.S. Application Data

(63) Continuation-in-part of application No. 08/737,239, filed as application No. PCT/DK95/00209 on May 26, 1995, now abandoned.

(30) Foreign Application Priority Data

May 27, 1994 (DK) ............................................... 0603/94

(51) Int. Cl.$^7$ ................................................ B09C 1/00
(52) U.S. Cl. ....................... 210/631; 204/517; 205/770; 205/771; 210/638; 210/663; 210/688; 210/257.2; 210/259; 210/912
(58) Field of Search ................................. 205/748, 750, 205/770, 771, 772; 210/631, 638, 663, 688, 257.2, 259, 912–914; 204/515, 517

(56) References Cited

U.S. PATENT DOCUMENTS

| | | | | |
|---|---|---|---|---|
| 5,074,986 A | * | 12/1991 | Probstein et al. | 204/130 |
| 5,190,628 A | * | 3/1993 | Bibler | 204/182.4 |
| 5,433,829 A | * | 7/1995 | Pool | 205/766 |
| 5,458,747 A | * | 10/1995 | Marks et al. | 205/771 |

FOREIGN PATENT DOCUMENTS

WO    WO 95/32816    * 12/1995

* cited by examiner

Primary Examiner—Ivars Cintins
(74) Attorney, Agent, or Firm—William J. Sapone; Coleman Sudol Sapone, P.C.

(57) ABSTRACT

The invention uses the electro-kinetic principle for a method for the cleaning of materials contaminated with heavy metals, whereby use is made of an apparatus comprising two charge-selective ion-exchange membranes with different charges combined with an inner and an outer electrolyte solution chambers which are separated by the membranes which serve a blocking function. A surprisingly good degree of removal is achieved, particularly in relation to the current consumption, and at the same time the heavy metals can be precipitated in a separate vessel such that they can be reused.

9 Claims, 2 Drawing Sheets

METHOD AND APPARATUS FOR CLEANING PRODUCTS CONTAINING HEAVY METALS

CROSS-REFERENCE TO RELATED APPLICATIONS

This application is a continuation in part of application Ser. No. 08/737,239, filed Jul. 21, 1997, now abandoned, which was a §371 of PCT/DK95/00209 filed May 26, 1995.

BACKGROUND

This invention relates to a method for the removal of heavy metals from soil, mud, sludge and the like by the electro-kinetic process, whereby electric current is used to drive the heavy metals towards electrodes where they can be concentrated in an electrolyte solution from which they can be removed, and an apparatus for the execution of said method and the use hereof.

The need for cleaning soil and areas which are polluted with heavy metals is great and increasing in step with the recognition of the risks which these contaminated areas constitute in both the short and the long view for the environment.

Cleaning, however, is a very complicated and costly process. This means that in the most threatened areas the contaminated earth or sludge must be removed and deposited under controlled conditions for the safety of the surrounding environment.

In other words, the polluted material is isolated and thus the problem of cleaning is postponed until later.

Consequently, there is a great need for a method of cleaning which is suitable for the removal of heavy metals.

Efforts have been made with a so-called electro-kinetic method, whereby electric current is used to drive the heavy metals which exist in the earth in the form of ions towards electrodes where the metal can be concentrated and thereafter removed.

In practice, two electrodes are placed in separate chambers at a suitable distance in the earth. The positive heavy metal ions hereby move towards the negative electrode and the negative heavy metal ions towards the positive electrode.

However, there is a difference in the mobility or the movement of the ions which stem from the electrode process and the heavy metal ions which are bound in the earth. The ions from the electrodes process are the least bound and are herewith of the easiest movability.

There thus arises the problem that a considerable part of the process current will be used to convey ions from the one electrode chamber to the other, so that only a smaller part of the power is utilized in the removal of the heavy metals in the earth.

This means that this known method is not particularly effective and, moreover, uneconomic in relation to the costs involved in the removal and the depositing of earth contaminated with heavy metals, which in turn means that the method has not been taken into practical use.

SUMMARY OF THE INVENTION

According to the invention, by using a method whereby the earth is separated from electrodes in chambers, and that there is placed a cation-exchange membrane to prevent anions from the negative electrode chamber from seeping out into the earth and at the same time permit the passage of positive heavy metal ions from the earth and out in the negative electrode chamber, and also placing a second ion exchange membrane to prevent the passage of cations from the positive electrode chamber into the earth and at the same time permit the passage of heavy metal ions from the earth to seep out in the positive electrode chamber, there is achieved the advantage that the ions from the electrode chamber do not pass out into the earth, but remain in the electrolyte solution. The energy is hereby utilized in a far more efficient manner, i.e., solely from the transport of the earth-bound ions to the electrodes, and not for the transport of ions between the electrodes.

According to the invention, it hereby becomes possible to clean products contaminated with heavy metals with a consumption of energy which is particularly competitive with other forms of cleaning, and at the same time to ensure a considerable degree of cleaning effect and herewith the possibility of achieving a degree of cleaning which is surprisingly high.

By using the inventive apparatus comprising an electrode in an electrolyte solution in a chamber separated from a second electrolyte solution in a second chamber by means of ion-exchange membranes, and separating this second electrode chamber from the earth by means of other ion-exchange membranes, an electrode unit which functions satisfactorily is achieved in a surprisingly simple manner.

An optimum effect of the electrode is ensured by isolating the electrolyte solution in the electrode chamber from the remaining electrolyte solution.

By using a circulating electrolyte solution, this can be pumped to a separate electrode chamber where the heavy metals can be deposited and removed from the electrolyte solution.

Finally, it is expedient to use the method and the apparatus for the cleaning of earth, sludge and the like, either alone and/or in connection with a biological cleaning of the earth.

DESCRIPTION OF THE INVENTION

The following is a more detailed description of an example of the apparatus for the execution of the cleaning method.

Figure 1:
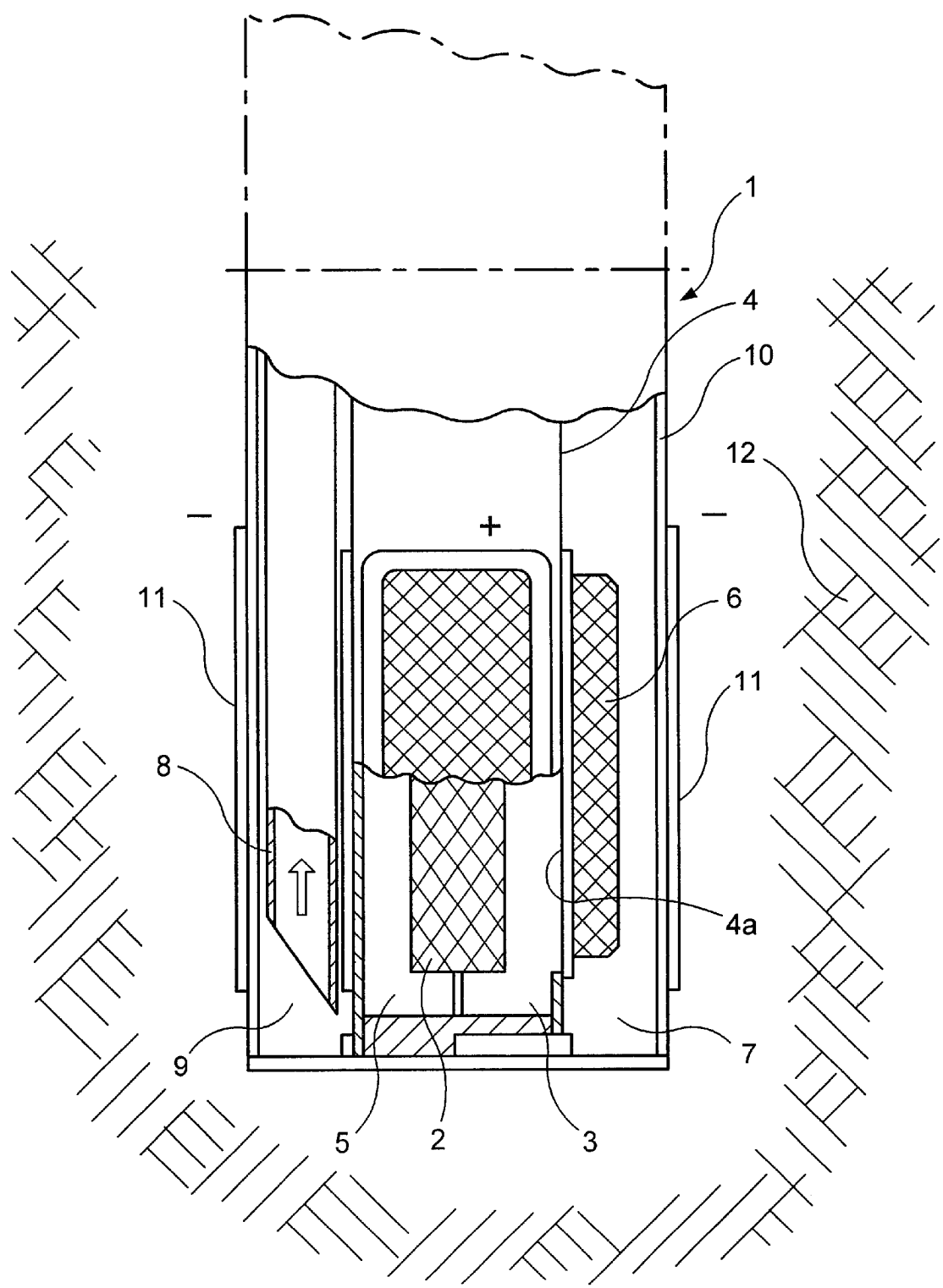
FIG. 1 is a cross-sectional view of an electrode unit according to the present invention.

Referring to FIG. 1, the apparatus is an electrode unit 1 in which innermost comprises an electrode element 2 which is connected to a power supply (not shown) which, for example, is negative.

Around the electrode element there is arranged a closed a chamber 3, defined by a sidewall 4 which is filled with an electrolyte solution 5 of a commonly-known kind, such as a sodium nitrate solution, which is electrically conductive.

In an opening 4a on the side wall 4 of the chamber 3 there is mounted at least one ion exchange membrane 6 which is charge selective. Two membranes are shown in the view of FIG. 1. In the example described, the membrane 6 is positive. The membrane can be made of any suitable supportive and chemically resistant material which is not electrically conductive.

The chamber side wall itself can be configured of membrane material, merely providing that this is of adequate strength. The material used can be known cellular ceramic materials and the like.

The charge-selective ion-exchange membranes 6 are in contact with an additional circulating electrolyte solution 7 which extends and circulates around the side wall 4 of the electrode chamber, exiting via a pipe 8, said solution residing in a closed chamber 9, bordered by an outer wall 10, which constitutes the exterior of the unit 1.

It should be noted that the electrolyte solution 5 around the electrode is separated from the circulating solution 7.

Figure 2:
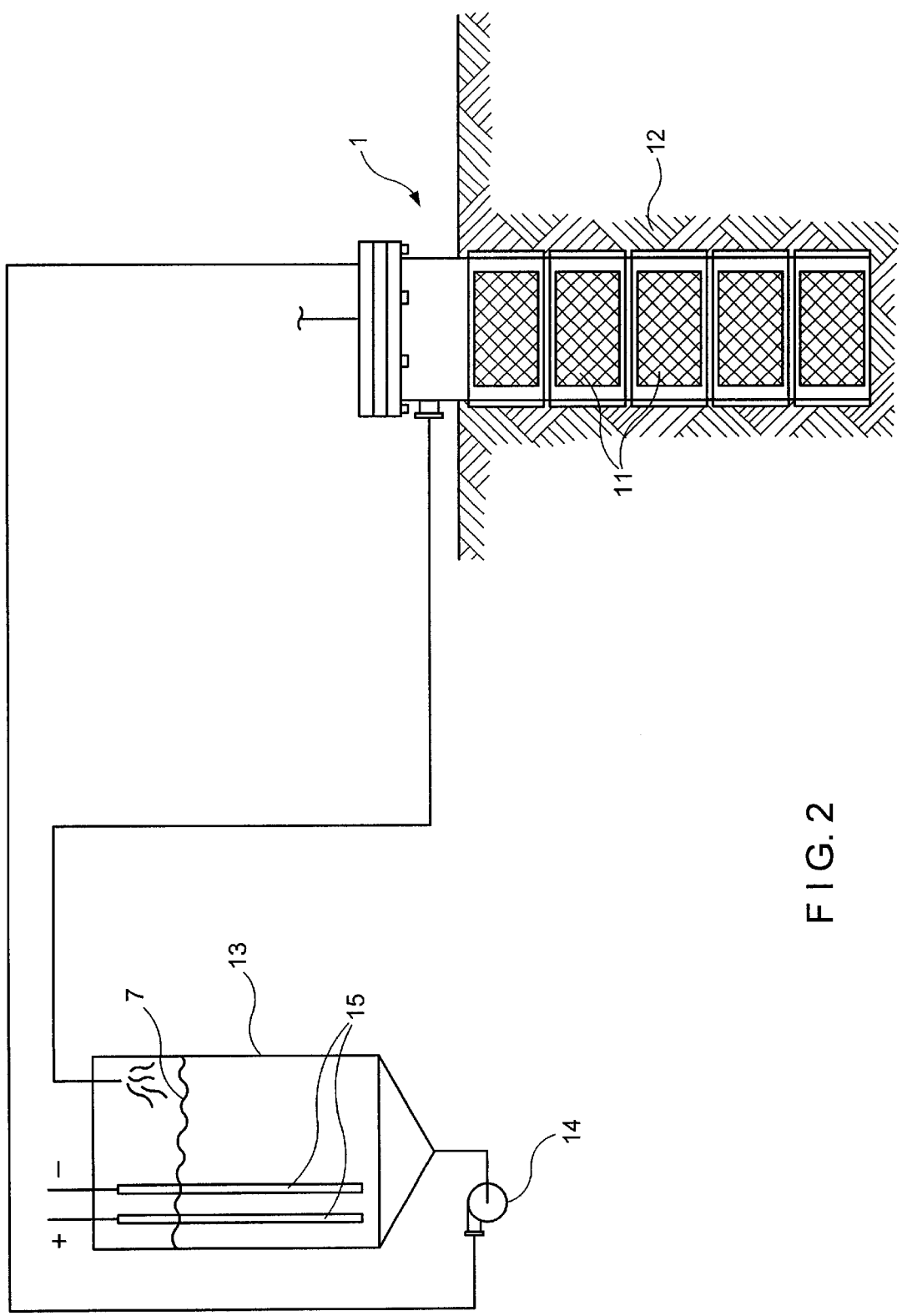
FIG. 2 is an illustrative view showing the electrode unit in use.

The outer chamber 9 is outermost defined by the outer wall 10 which has one or more additional charge-selective ion-exchange membranes 11, which in the example described are negatively charged. In FIG. 2, five elements are shown I one side of the unit 1.

Similarly to the electrode chamber side wall 11, these membranes can also be configured to form the outer wall 10.

Referring to FIG. 2, during operation, the unit 1 is submerged in the product 12 which is required to be cleaned, and which can be earth or the like such as sludge, sediments, cleaning residuals, etc., which are contaminated with heavy metals.

The unit 1 is in liquid connection with a collection vessel 13 and has a pump 14 for the circulating electrolyte solution 7. During operation, the heavy-metal ions will be concentrated in the solution in the unit 1. By passing electrodes 15 which are placed in the vessel 13, each having its own charge, the ions will be precipitated. In this manner the metals can be removed, and the solution 7 can be recirculated to the unit 1.

The following is a description of the method:

When the units are placed in the product which is required to be cleaned, the power supply and the electrolyte solution are established as described earlier.

There is thus established a plant which functions as an electro-kinetic heavy-metal cleaning method for heavy metals.

The contaminated product is separated from the electrode chambers in such a manner that the cation-exchange membrane prevents anions from the negative electrode chamber from seeping out into the contaminated product, which can be earth, but at the same time allows the positive heavy-metal ions to pass from the product, the earth, into the negative electrode chamber.

At the same time, the anion-exchange membrane prevents cations from the positive electrodes from passing into the product, the earth, but allows the passage of negative heavy-metal ions from the product to seep into the positive electrode chamber in the unit.

There is hereby ensured the best possible utilization of the current, which makes the method and the means particularly competitive when compared with other known methods of cleaning.

To this can be added that the precipitation of the heavy metals which occurs is so effective that these can be reused and hereby contribute in a positive manner to the profitability of the plant.

The method and the apparatus according to the invention therefore have the advantage that they can be used directly in the contaminated product such as earth, sludge, sedimentations in tanks and the like.

In this connection it should be noted that the units can be provided with several separate electrolyte solutions and ion-selective membranes, hereby enabling a selective cleaning of specific metal ions to be achieved.

Finally, the method can be used in connection with other methods of cleaning, e.g., in connection with a biological cleaning, where the heat developed by the method is utilized to further the biological cleaning process.

In summary, the invention is a method for cleaning of earth, sludge and the like containing heavy metals by use of the electro-kinetic method, whereby electric current is used to drive the heavy metals towards electrodes where they can be concentrated in an electrolyte solution and thereafter removed, characterized in that the earth is separated from the electrode by chambers. A cation-exchange membrane is used to prevent anions from the negative electrode chamber from seeping out into the earth and at the same time allow passage of positive heavy-metal ions from the earth and into the negative electrode chamber, and also that a second ion-exchange membrane is used to prevent passage of cations from the positive electrode chamber into the earth and at the same time allow passage of heavy-metal ions from the earth to seep into the positive electrode chamber.

An apparatus for the execution of the method described about is characterized in that the electrode is placed in an electrolyte solution in a chamber, said chamber being separated from a second electrolyte solution chamber by means of one or more charge-selective ion-exchange membranes, and in that the second electrolyte solution chamber is separated from the earth by means of one or more other charge-selective ion-exchange membranes.

The apparatus can further be characterized in that the electrolyte solution in the chamber with the electrode is isolated from the electrolyte solution in the second chamber.

The apparatus can further be characterized in that the electrolyte solution in the second chamber can be led out to a collection vessel which has electrodes for the separation of the heavy metals, after which the electrolyte solution can be recirculated to the chamber, using a pump or other recirculating means.

The charges of the electrode, inner membrane and outer membrane can be negative, positive, negative or positive, negative, positive, respectfully, depending on the type of ion to be removed.

Use of the method and the apparatus described above can be used alone and/or supplemented with a biological cleaning process.

While preferred embodiments of the invention have been shown and described, it will be understood that various modifications can be made without varying from the scope of the invention.

What is claimed is:

1. A method for removing heavy metals from earth or sludge by using electric current to drive the heavy metals towards an electrode comprising:

providing an apparatus having two charge selective ion-exchange membranes with different charges, a first charge selective ion-exchange membrane disposed in a side wall defining an inner chamber, one or more second oppositely charged selective ion-exchange membranes configured to form an outer wall defining an outer chamber, an electrode located in the inner chamber, placing the apparatus in the earth or sludge, providing an electrolyte solution in the inner chamber, providing an electrolyte solution in the outer chamber, the electrolyte solution in the outer chamber separated from the electrolyte solution in the inner chamber by the first charge selective ion exchange membrane, the electrolyte solution in the outer chamber separated from the earth or sludge by the one or more second oppositely charged ion exchange membranes, providing electric current to the electrode such that heavy metal ions pass from the earth or sludge into the outer chamber where they are concentrated, the first charge selective membrane preventing the heavy metals ions from reaching the electrode and the one or more second oppositely charged ion-exchange membranes preventing charged ions from passing out into the earth.

2. The method of claim 1 wherein the first ion-exchange membrane is positively charged, the one or more second ion-exchange membranes are negatively charged and the electrode is negatively charged.

3. The method of claim 1 wherein the electrode is positively charged, the first ion exchange membrane is negatively charged, and the one or more second ion exchange membranes are positively charged.

4. The method of claim 1 further comprising circulating the second electrolyte solution to a vessel and placing electrodes in the vessel for precipitating the heavy metals therein.

5. The method of claim 1 further comprising treating the earth or sludge with a biological cleaning process.

6. An apparatus for removing heavy metals from earth or sludge comprising a unit having an electrode, two charge selective ion-exchange membranes with different charges, a first charge selective ion exchange membrane disposed in a first wall disposed about the electrode for forming an inner chamber and one or more second charge selective ion exchange membranes configured to form a second wall forming an outer chamber, a first electrolyte disposed in the inner chamber and a second electrolyte disposed in the outer chamber, the electrolytes separated by the first charge selective ion-exchange membrane, and the second electrolyte separated from the earth or sludge by the one or more second charge selective ion exchange membranes, wherein heavy metal ions pass from the earth or sludge through the one or more second ion exchange membranes into the outer chamber and wherein charged ions are prevented by the one or more second ion exchange membranes from passing from the electrode into the earth or sludge.

7. The apparatus of claim 6 further comprising a collection vessel, the second electrolyte in the outer chamber circulated to the collection vessel, electrodes being disposed in the collection vessel such that the heavy metals precipitate therein.

8. The apparatus of claim 6 wherein the electrode is negatively charged, the first charge selective ion exchange membrane is positively charged and the one or more second charge selective ion exchange membranes are negatively charged.

9. The apparatus of claim 6 wherein the electrode is positively charged, the first ion exchange membrane is negatively charged and the one or more second ion exchange membranes are positively charged.

* * * * *